United States Patent
Springer et al.

(10) Patent No.: US 12,284,460 B2
(45) Date of Patent: Apr. 22, 2025

(54) PROVIDING INSTANT PROCESSING OF VIRTUAL MEETING RECORDINGS

(71) Applicant: Zoom Video Communications, Inc., San Jose, CA (US)

(72) Inventors: Shane Paul Springer, Manchester, MI (US); Alexander Waibel, Sammamish, WA (US)

(73) Assignee: Zoom Video Communications, Inc., San Jose, CA (US)

( * ) Notice: Subject to any disclaimer, the term of this patent is extended or adjusted under 35 U.S.C. 154(b) by 69 days.

(21) Appl. No.: 17/732,891

(22) Filed: Apr. 29, 2022

(65) Prior Publication Data
US 2023/0353704 A1 Nov. 2, 2023

(51) Int. Cl.
*H04N 5/91* (2006.01)
*G11B 27/031* (2006.01)
*H04L 65/403* (2022.01)

(52) U.S. Cl.
CPC ............. *H04N 5/91* (2013.01); *G11B 27/031* (2013.01); *H04L 65/403* (2013.01)

(58) Field of Classification Search
CPC ........ H04N 5/91; G11B 27/031; H04L 65/403
See application file for complete search history.

(56) References Cited

U.S. PATENT DOCUMENTS

| | | | | |
|---|---|---|---|---|
| 10,002,639 | B1* | 6/2018 | Gaeta | G10L 21/00 |
| 11,418,545 | B2* | 8/2022 | Adams | G06F 21/16 |
| 2002/0163532 | A1 | 11/2002 | Thomas et al. | |
| 2005/0180341 | A1* | 8/2005 | Nelson | H04L 65/1083 709/204 |
| 2006/0251384 | A1 | 11/2006 | Vronay et al. | |
| 2010/0053302 | A1* | 3/2010 | Ivashin | H04N 7/147 348/14.08 |
| 2010/0158203 | A1* | 6/2010 | Mikan | H04M 3/42221 379/68 |
| 2012/0057847 | A1 | 3/2012 | Casagrande | |
| 2012/0263430 | A1 | 10/2012 | Spitzer-Williams | |
| 2012/0274731 | A1* | 11/2012 | Shanmukhadas | H04L 12/1831 348/14.08 |

(Continued)

*Primary Examiner* — Olisa Anwah
(74) *Attorney, Agent, or Firm* — Kilpatrick Townsend & Stockton LLP

(57) ABSTRACT

Systems and methods for providing instant processing of virtual meeting recordings are provided. A system may include a non-transitory computer-readable medium; a communications interface; and a processor configured to execute processor-executable instructions stored in non-transitory computer-readable medium to: establish a virtual meeting having a plurality of participants, each participant of the plurality of participants exchanging audio or video streams via the virtual meeting; record, responsive to an indication from one of the plurality of participants, the audio or video streams from the plurality of participants; generate a recording of one or more audio or video tracks corresponding to the audio or video streams exchanged during the virtual meeting; receive, from a first client device, a request to customize the recording, the request comprising an identification of customizable content and a modification action; generate a customized recording based on applying the modification action to the identified customizable content.

19 Claims, 10 Drawing Sheets

(56) References Cited

U.S. PATENT DOCUMENTS

| | | | |
|---|---|---|---|
| 2013/0266127 A1* | 10/2013 | Schachter | G10L 25/48 |
| | | | 379/88.01 |
| 2016/0117339 A1* | 4/2016 | Raskin | G06Q 10/067 |
| | | | 434/319 |
| 2019/0110856 A1 | 4/2019 | Barral et al. | |
| 2019/0289046 A1* | 9/2019 | Weber | H04L 65/4053 |
| 2019/0370283 A1* | 12/2019 | Church | G06N 3/08 |
| 2020/0057866 A1* | 2/2020 | Levy | G06F 21/6245 |
| 2022/0311631 A1* | 9/2022 | Quincy | H04L 12/1818 |
| 2023/0134899 A1* | 5/2023 | Biswas | H04N 7/157 |
| | | | 709/204 |
| 2023/0154497 A1* | 5/2023 | Malan | H04L 65/752 |
| | | | 386/278 |
| 2023/0186225 A1* | 6/2023 | Vepa | G06F 40/35 |
| | | | 705/7.42 |
| 2023/0297765 A1* | 9/2023 | Vendrow | G06F 40/166 |
| | | | 704/251 |

\* cited by examiner

| Introduction 502 | Topic 1 504 | Topic 2 506 | Q & A 508 | Final Comments 510 |

| Small Talk 512 | Topic 1 514 | Break 516 | Topic 1 518 | Private 520 | Small Talk 522 |

PROVIDING INSTANT PROCESSING OF VIRTUAL MEETING RECORDINGS

FIELD

The present application generally relates to videoconferences and more particularly relates to systems and methods for providing instant processing of virtual meeting recordings.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

FIGS. 5A/B illustrate example segmentations of a virtual meeting recording, according to an embodiment herein;

DETAILED DESCRIPTION

Figure 1:
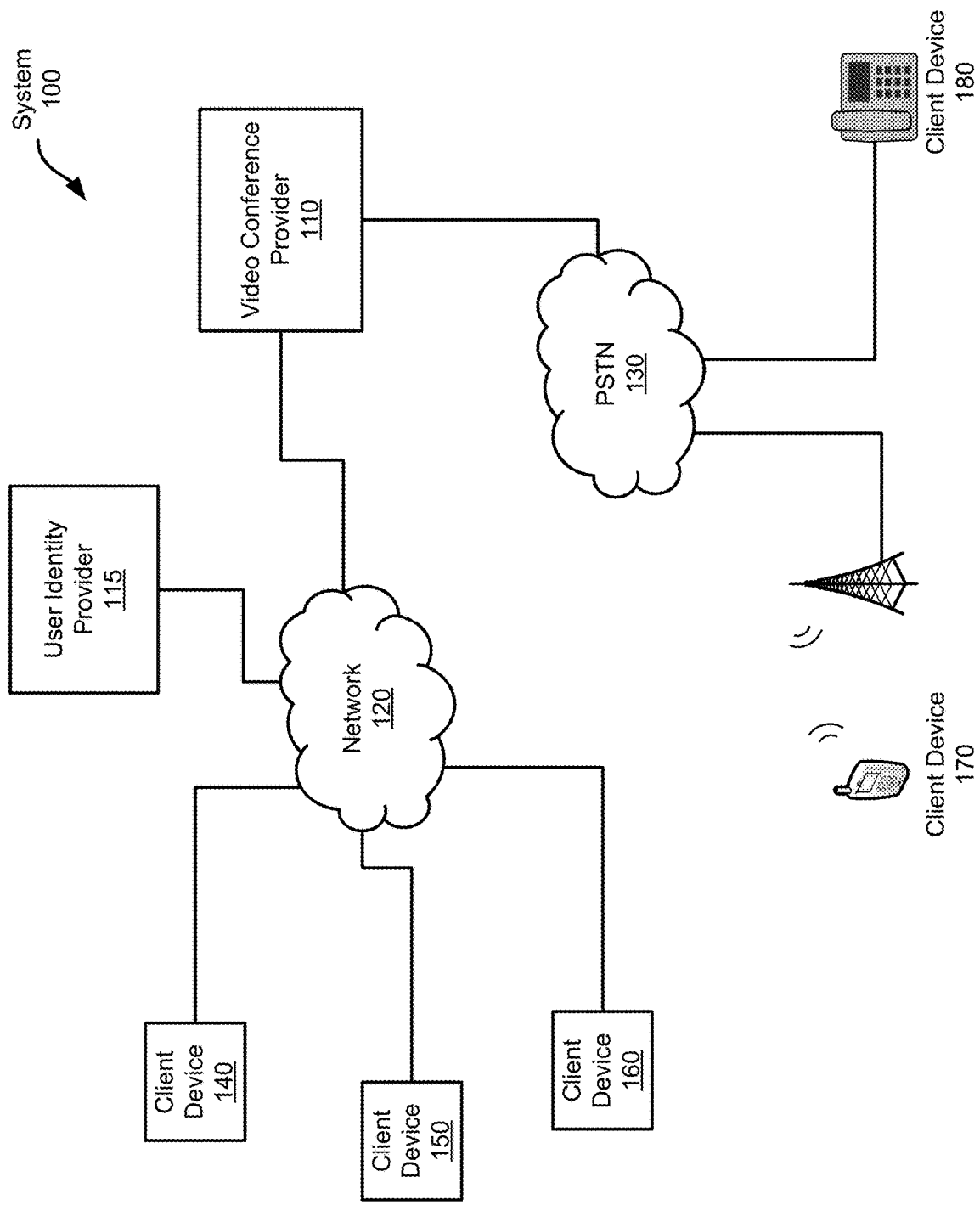
FIGS. 1, 2, and 3 show example systems for providing instant processing of virtual meeting recordings, according to an embodiment herein.

Examples are described herein in the context of systems and methods for providing instant processing of virtual meeting recordings. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Video conference providers can enable people to interact with each other using their own computers (or "client devices") with both video and audio in a variety of settings, such as in one-on-one conversations, group meetings, and webinars. While each of these types of settings can allow people to interact with each other, they can differ in character. For example, one-on-one conversations include only two people and may involve only a small amount of data being transmitted between the two client devices. Group meetings may involve a larger number of people all interacting with each other. In contrast, webinars typically involve a group of people that are attending to hear presentations from one or more presenters. Thus, in a webinar, interaction tends to be mostly one-way: from the presenter(s) to the audience. In addition, webinars can have very large numbers of participants, potentially numbering in the thousands or tens of thousands.

As the popularity of virtual meetings to replace conventional, in-person meetings, continues to rise, so too does the increase in privacy concerns for participants while in the virtual space. While participating in virtual meetings, participants generally have little control over their privacy, especially if a virtual meeting is being recorded. Conventionally, if a participant wants to join a virtual meeting that is being recorded, the participant must either consent to being recorded, by both audio streams and video streams, or leave the virtual meeting. While, in some circumstances, a participant may join a recorded meeting without video and choose to not speak during the meeting, the participants personal information regarding his or her attendance is still associated with the recording. Moreover, attending the meeting in this manner diminishes the participant participation in the virtual meeting and can lead to a less meaningful experience. Accordingly, there is a need for allowing participants to attending a recorded meeting while maintaining control over their privacy.

To provide virtual meeting participants with control over their personal privacy during a recorded meeting, systems and methods are provided herein for providing instant processing of virtual meeting recordings. The systems and methods for providing instant processing of virtual meeting recordings can allow a participant to control the level and/or degree to which content is present within a meeting recording when the recording is shared with a recipient group. For example, in some embodiments, the participant may use the instant processing system herein to segment the meeting recording such that only applicable segments of the virtual meeting are shared with a respective recipient. In such an example, the participant may remove segments of the virtual meeting recording that involve small talk or private discussion prior to or after a topic presentation. The segmentation of the meeting recording may allow the participant to only share the segments of the recording that pertain to the topic presentation.

In other embodiments, the participant may use the instant processing system to remove or edit irrelevant content from the meeting recording. For example, a participant may modify the recording to remove or redact jokes, profanity, or confidential material. In still further embodiments, a participant may use the instant processing system to normalize the recording. For example, the participant may normalize the recording to remove extended pauses or breaks during a presentation or speech or normalize the cadence or speed at which participants speak during a virtual meeting.

By providing participants increased control over recorded content, participants may more fully engage in a recorded virtual meeting without concern about sharing personal information with individuals outside of the virtual meeting or unknown individuals after the meeting. Moreover, the instant processing of meeting recordings can allow participants to tailor a specific sharing of a recording to a desired audience. For example, a meeting recording may be tailored in one manner for a first audience and then tailored in a second, different manner for a second audience. In this way, the systems and methods for providing instant processing of virtual meeting recordings, as provided herein, can allow participants to fully customize a meeting recording to fit a desired purpose and audience. Moreover, the instant processing systems and methods also provide participants the confidence to fully engage with a virtual meeting without concerns of all content, personal and private alike, being shared on the backend with all audiences.

This illustrative example is given to introduce the reader to the general subject matter discussed herein and the disclosure is not limited to this example. The following sections describe various additional non-limiting examples and examples of systems and methods for providing instant processing of virtual meeting recordings.

Referring now to FIG. 1, FIG. 1 shows an example system 100 that provides videoconferencing functionality to various client devices. The system 100 includes a video conference provider 110 that is connected to multiple communication networks 120, 130, through which various client devices 140-180 can participate in video conferences hosted by the video conference provider 110. For example, the video conference provider 110 can be located within a private network to provide video conferencing services to devices within the private network, or it can be connected to a public network, e.g., the internet, so it may be accessed by anyone. Some examples may even provide a hybrid model in which a video conference provider 110 may supply components to enable a private organization to host private internal video conferences or to connect its system to the video conference provider 110 over a public network.

The system optionally also includes one or more user identity providers, e.g., user identity provider 115, which can provide user identity services to users of the client devices 140-160 and may authenticate user identities of one or more users to the video conference provider 110. In this example, the user identity provider 115 is operated by a different entity than the video conference provider 110, though in some examples, they may be the same entity.

Figure 2:
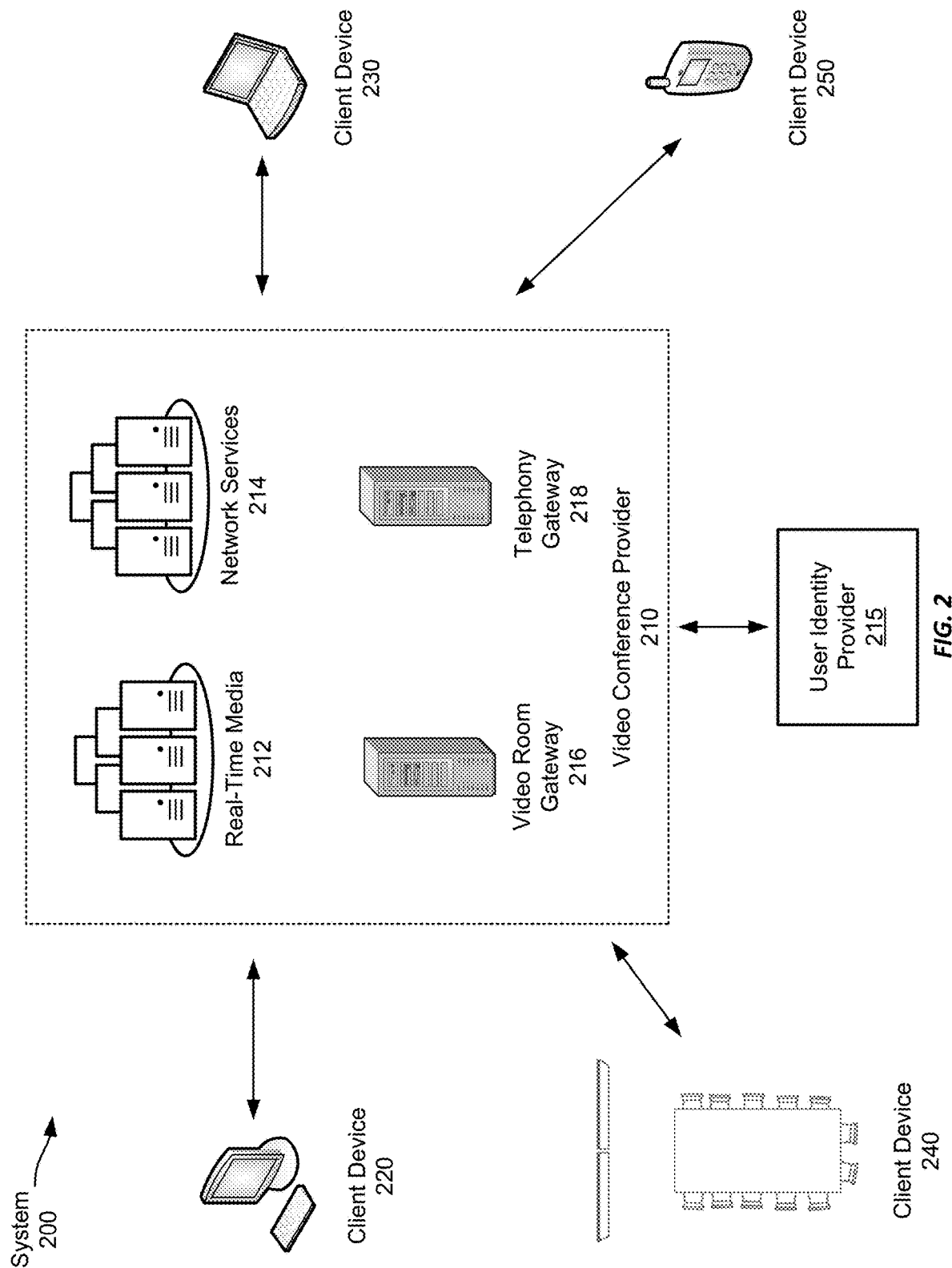

Video conference provider 110 allows clients to create videoconference meetings (or "meetings") and invite others to participate in those meetings as well as perform other related functionality, such as recording the meetings, generating transcripts from meeting audio, generating summaries and translations from meeting audio, manage user functionality in the meetings, enable text messaging during the meetings, create and manage breakout rooms from the virtual meeting, etc. FIG. 2, described below, provides a more detailed description of the architecture and functionality of the video conference provider 110. It should be understood that the term "meeting" encompasses the term "webinar" used herein.

Meetings in this example video conference provider 110 are provided in virtual rooms to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used.

To create a meeting with the video conference provider 110, a user may contact the video conference provider 110 using a client device 140-180 and select an option to create a new meeting. Such an option may be provided in a webpage accessed by a client device 140-160 or client application executed by a client device 140-160. For telephony devices, the user may be presented with an audio menu that they may navigate by pressing numeric buttons on their telephony device. To create the meeting, the video conference provider 110 may prompt the user for certain information, such as a date, time, and duration for the meeting, a number of participants, a type of encryption to use, whether the meeting is confidential or open to the public, etc. After receiving the various meeting settings, the video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started or the host may be required to specifically admit one or more of the users.

During the meeting, the participants may employ their client devices 140-180 to capture audio or video information and stream that information to the video conference provider 110. They also receive audio or video information from the video conference provider 210, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting and they will no longer receive audio or video streams for the meeting (and will stop transmitting audio or video streams). The video conference provider 110 may also invalidate the meeting information, such as the meeting identifier or password/passcode.

To provide such functionality, one or more client devices 140-180 may communicate with the video conference provider 110 using one or more communication networks, such as network 120 or the public switched telephone network ("PSTN") 130. The client devices 140-180 may be any suitable computing or communications device that have audio or video capability. For example, client devices 140-160 may be conventional computing devices, such as desktop or laptop computers having processors and computer-readable media, connected to the video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can making conventional telephone calls and is not limited solely to dedicated telephony devices like conventional telephones.

Referring again to client devices 140-160, these devices 140-160 contact the video conference provider 110 using network 120 and may provide information to the video conference provider 110 to access functionality provided by the video conference provider 110, such as access to create new meetings or join existing meetings. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the video conference provider 110.

A user identity provider 115 may be any entity trusted by the video conference provider 110 that can help identify a user to the video conference provider 110. For example, a trusted entity may be a server operated by a business or other organization and with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 115 by the user and secured by a password or additional security features, such as biometric authentication, two-factor authentication, etc. However, identities may be distinct from functionality such as email. For example, a health care provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the video conference provider 110.

When the user accesses the video conference provider 110 using a client device, the video conference provider 110 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the video conference provider 110 either provides or denies access to its services, respectively.

For telephony devices, e.g., client devices 170-180, the user may place a telephone call to the video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the video conference provider 110. For example, telephony devices may be unable to provide user identification information to identify the telephony device or the user to the video conference provider 110. Thus, the video conference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide user identification information to the video conference provider 110, even in cases where the user has an authenticated identity and employs a client device capable of identifying the user to the video conference provider 110. The video conference provider 110 may determine whether to allow such anonymous users to use services provided by the video conference provider 110. Anonymous users, regardless of the reason for anonymity, may be restricted as discussed above with respect to users employing telephony devices, and in some cases may be prevented from accessing certain meetings or other services, or may be entirely prevented from accessing the video conference provider 110.

Referring again to video conference provider 110, in some examples, it may allow client devices 140-160 to encrypt their respective video and audio streams to help improve privacy in their meetings. Encryption may be provided between the client devices 140-160 and the video conference provider 110 or it may be provided in an end-to-end configuration where multimedia streams (e.g., audio or video streams) transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the video conference provider 110, while allowing the video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a video conference provider 110 having access to the substance of the meeting. Any suitable encryption methodology may be employed, including keypair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the video conference provider 110. Further, such a system enables users to use a wide variety of different client devices 140-180 from traditional standards-based video conferencing hardware to dedicated video conferencing equipment to laptop or desktop computers to handheld devices to legacy telephony devices, etc.

Referring now to FIG. 2, FIG. 2 shows an example system 200 in which a video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the video conference provider 210 over a communications network, such as the internet for client devices 220-240 or the PSTN for client device 250, generally as described above with respect to FIG. 1. The video conference provider 210 is also in communication with one or more user identity providers 215, which can authenticate various users to the video conference provider 210 generally as described above with respect to FIG. 1.

In this example, the video conference provider 210 employs multiple different servers (or groups of servers) to provide different Examples of video conference functionality, thereby enabling the various client devices to create and participate in video conference meetings. The video conference provider 210 uses one or more real-time media servers 212, one or more network services servers 214, one or more video room gateways 216, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the video conference provider 210. In some such examples, the real-time media servers 212 may decrypt incoming multimedia streams, multiplex the multimedia streams appropriately for the various clients, and encrypt the multiplexed streams for transmission.

As mentioned above with respect to FIG. 1, the video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the video conference provider 210 may allow a meeting participant to notify it of inappropriate behavior or content in a meeting. Such a notification may trigger the real-time media servers to 212 record a portion of the meeting for review by the video conference provider 210. Still other functionality may be implemented to take actions based on the decrypted multimedia streams at the video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system 210 and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the video conference provider under a supervisory set of servers. When a client device 220-250 accesses the video conference provider 210, it will typically communicate with one or more network services servers 214 to access their account or to participate in a meeting.

When a client device 220-250 first contacts the video conference provider 210 in this example, it is routed to a network services server 214. The client device may then provide access credentials for a user, e.g., a username and password or single sign-on credentials, to gain authenticated access to the video conference provider 210. This process may involve the network services servers 214 contacting a user identity provider 215 to verify the provided credentials. Once the user's credentials have been accepted, the network services servers 214 may perform administrative functionality, like updating user account information, if the user has an identity with the video conference provider 210, or scheduling a new meeting, by interacting with the network services servers 214.

In some examples, users may access the video conference provider 210 anonymously. When communicating anonymously, a client device 220-250 may communicate with one or more network services servers 214 but only provide information to create or join a meeting, depending on what features the video conference provider allows for anonymous users. For example, an anonymous user may access the video conference provider using client device 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, assigning or moving users to the mainstage or a breakout room if present, recording meetings, etc. Such functionality may be managed by the network services server(s) 214.

For example, if a host wishes to remove a user from a meeting, they may identify the user and issue a command through a user interface on their client device. The command may be sent to a network services server 214, which may then disconnect the identified user from the corresponding real-time media server 212. If the host wishes to remove one or more participants from a meeting, such a command may also be handled by a network services server 214, which may terminate the authorization of the one or more participants for joining the meeting.

In addition to creating and administering on-going meetings, the network services server(s) 214 may also be responsible for closing and tearing-down meetings once they have completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the video conference provider 210. For example, the video conferencing hardware may be provided by the video conference provider to one or more of its subscribers, which may provide access credentials to the video conferencing hardware to use to connect to the video conference provider 210.

The video room gateway servers 216 provide specialized authentication and communication with the dedicated video conferencing hardware that may not be available to other client devices 220-230, 250. For example, the video conferencing hardware may register with the video conference provider when it is first installed and the video room gateway may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the video conference provider 210.

Referring now to the telephony gateway servers 218, these servers 218 enable and facilitate telephony devices' participation in meetings hosed by the video conference provider 210. Because telephony devices communicate using the PSTN and not using computer networking protocols, such as TCP/IP, the telephony gateway servers 218 act as an interface that converts between the PSTN and the networking system used by the video conference provider 210.

For example, if a user uses a telephony device to connect to a meeting, they may dial a phone number corresponding to one of the video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio signals to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server 218 is instead joined to the meeting on the telephony device's behalf.

After joining the meeting, the telephony gateway server 218 receives an audio stream from the telephony device and provides it to the corresponding real-time media server 212, and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

Figure 3:
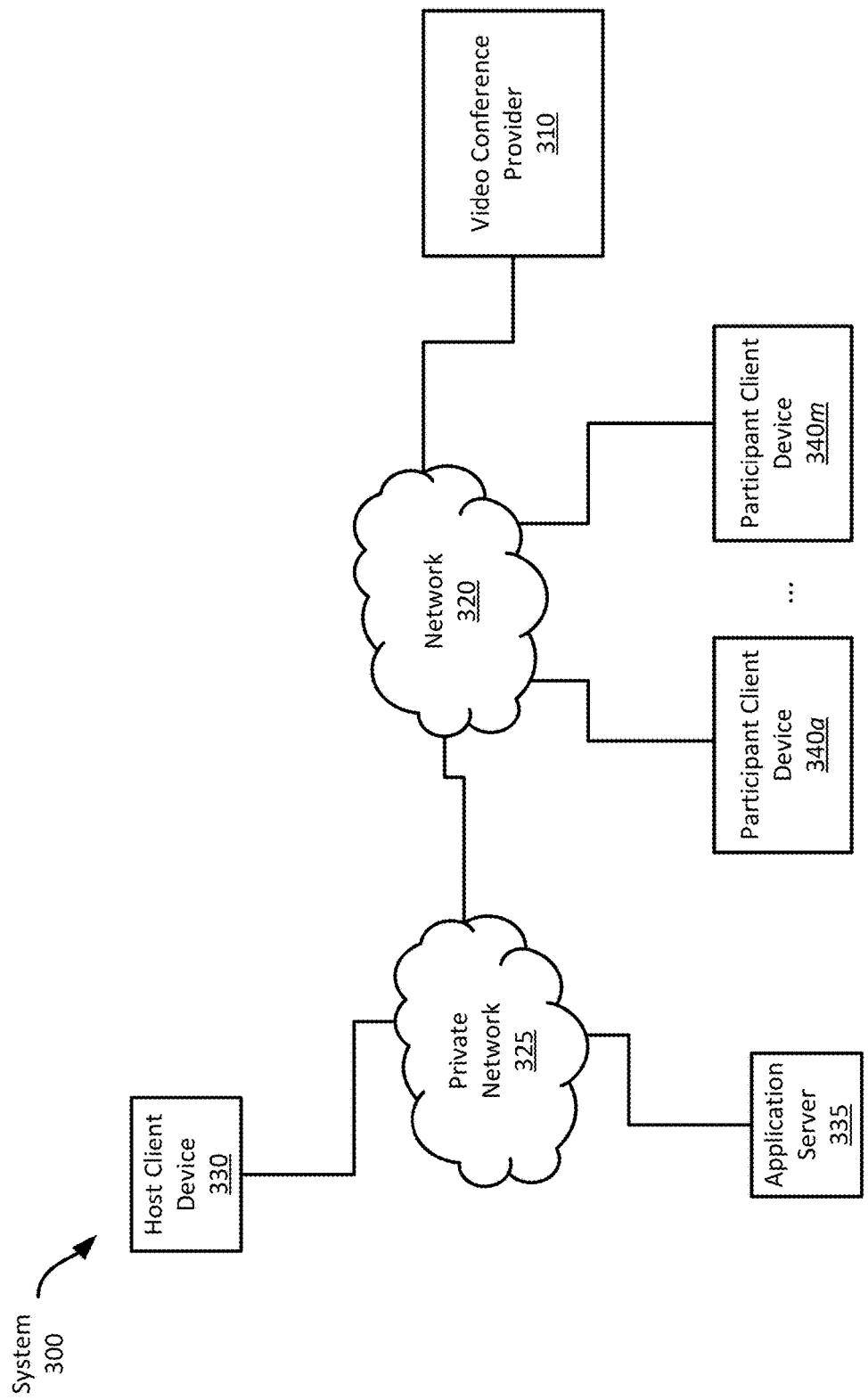

Referring now to FIG. 3, FIG. 3 shows an example system 300 for providing instant processing functionality for a recording of a virtual meeting. In this example, a video conference provider 310 provides video conference services to multiple different client devices 330 and 340*a-m*, generally as described above with respect to FIGS. 1 and 2. In this example, the client devices 330 and 340*a-m* participate in a meeting hosted by the video conference provider 310. Client devices 340*a-m* connect to the video conference provider 310 over a public network 320, e.g., the internet; however, host client device 330 participates from within a private network 325, such as from their office at work. In addition to the host client device 330, an application server 335 is connected to the private network and makes various business applications available to the host client device 330. In different examples, these business applications may vary; however, in this example, the application server 335 provides applications to access business databases and files. To access these various resources, the host client device 330 has different client applications installed on it and may also have web applications accessible via a web browser, which may be stored as bookmarks in the web browser.

To start a meeting, the host client device 330 connects to the video conference provider 310 and begins a virtual meeting ("meeting") at the video conference provider 310, such as by beginning a scheduled meeting, generally as described above with respect to FIGS. 1 and 2. The video conference provider 310 may create and manage the meeting as discussed above.

Once the virtual meeting is started, participants may be able to interact with other participants and see their respective names, such as in close proximity to other participants' video streams or in a list of participants visible in a graphical user interface ("GUI"). In some embodiments, the participants may only be able to see information, e.g., names or video feeds, from the host(s) of the meeting or certain select participants that will be engaged in discussions during the virtual meeting, such as panelists in a panel discussion. Still other limits may be imposed on the various participants, such as their ability to react to occurrences during the meeting, e.g., participants may be allowed to interact with their GUI to raise their hand to ask a question, but may not be allowed to provide any other feedback.

During the meeting one of the participant client devices 340*a-m* or the host client device 330 may request to record the meeting. The request to record the meeting may be transmitted to the video conference provider 310. In some embodiments, the video conference provider 310 may prompt the non-requesting client devices with a notification that the meeting is going to be recorded. For example, if the host client device 330 request to record the meeting, the participant client devices 340*a-m* may receive a notification that the meeting is going to be recorded. Once the meeting request is accepted, the video conference provider 310 may record the audio and video streams from all of the client devices, 340*a-m* and 330, until the recording is terminated or the meeting is ended.

As noted above, under the conventional virtual meeting recording architectures, participants need to either accept being recorded or leave the meeting. That is, presently, if a meeting is being recorded the audio and video streams from a client device, such as the participant client devices 340*a-m*, are recorded regardless if the respective participant wants to be recorded if the participant stays in the meeting. Moreover, participants of a recorded meeting have little-to-no control over the content of the meeting recording, regardless of the recipients receiving the meeting recording after the meeting is terminated.

To provide virtual meeting participants control over the content of a meeting recording, including his or her own audio and video stream(s) as recorded in the recording (herein referred to as audio and video "track(s)"), instant processing functionality for virtual meeting recordings is provided herein. The instant processing functionality may be automatically performed based on a participant's preferences and/or the meeting settings, as discussed in greater detail below with respect to FIG. 4. The instant processing functionality may provide virtual meeting participants control over their privacy when it comes to recordings and the ability to modify the content of a recording based on a specific recipient group. For example, a participant corresponding to the participant client device 340*a*, may want to participate in a virtual meeting, however, the participant may be uncomfortable with being recorded. The meeting, however, is being recorded for training and educational purposes. Under conventional video conferencing structures, the participant would be required to leave the meeting if he or she did not want to be recorded or have personally identifiable information present in the recording.

As provided herein, the instant processing functionality can provide a participant, such as a host, the ability to customize a meeting recording. Specifically, the instant processing functionality provides the participants, including the host, the ability to easily and quickly review a meeting recording and generate a customized recording to be shared with one or more recipient groups. That is, the instant processing functionality allows easy customization of the recording content based on the recipient group(s). For example, the host may want to remove any private or personally identifiable information (e.g., name, location, company, credit card information) that was shared during the meeting when the recording is shared with recipients outside of the meeting participant list. Similarly, one or more participants may have made jokes during the meeting and the host now wishes to share the recording with a prospective employer, thereby lending the jokes to be irrelevant to the context of the recipient. As the prospective employer is the intended audience of the recording, the host may want to remove the jokes from the recording to only provide professional-grade content to the prospective employer. In yet another example, the host may want to share a meeting recording as part of a college application, and thus may desire to polish the recording. Throughout the recording, however, the host may have stuttered or had long pauses during his presentation. As such, the host may desire to remove the stutters and long pauses to provide a polished meeting recording as part of his or her college application.

By providing the host with granular control of the content of a meeting recording, the host, along with the other participants, can fully participate in the meeting without concern for content within the recording when the recording is shared with various recipient groups.

To invoke the instant processing functionality, a participant may request to customize the recording. For example, after the meeting terminates, the participant client device 340*a* may request to send the meeting recording to a first recipient group. Prior to sending the meeting recording, the participant client device 340*a* may request to customize the recording or submit a recording customization request. In some embodiments, the recording customization request may be provided or prompted to the participant client device 340*a* when the participant submits the request to share the meeting recording. In other embodiments, the participant client device 340*a* may set his or her recording customization preferences, as discussed in greater detail below with respect to FIG. 4, and any recording shared by the participant client device 340*a* may be customized according to those settings. For example, the participant associated with the participant client device 340*a* may indicate to always remove jokes from meeting recordings as he or she has a tendency to make too many jokes. As such, meeting recordings that involve the participant client device 340*a* that are shared, may always be modified or customized to remove jokes made by that participant.

The recording customization request may be transmitted from the participant client device 340*a* to the video conference provider 310. Once the video conference provider 310 receives the recording customization request, the video conference provider 310 may modify the recording of the audio and video streams associated with the participant client device 340*a*. In some embodiments, the audio and/or video tracks associated with the other participant client devices 340*b-m* and the host client device 330 may be customized in the meeting recording. For example, the participant client device 340*a* may request to normalize the meeting recording. As will be discussed in detail below, normalizing may involve modifying or adjusting the audio streams and/or the video tracks within a recording such that they are uniform on a common metric, for example speech cadence or speech pauses.

It should be understood that in some embodiments, customization of the meeting recording may include modification of one or more audio tracks, one or more video tracks, or both the audio and video tracks within the recording. In other embodiments, customization to the meeting recording may also include modification of non-audio or video content. For example, during customization to the meeting recording any chat messages, documents exchanged, or transcripts associated with the meeting recording may also be modified based on the customization preferences of the participant. In some embodiments, modification of the audio track and/or the video track within the recording may include erasing or removing the audio track and/or video track completely from the recording.

In some embodiments, the other participants in the virtual meeting and/or the recipient group(s) may be notified or informed when a participant customizes a recording for sharing. For example, when the participant client device 340*a* shares a customized recording, the participant client devices 340*b-m* and the host client device 330 may receive an indication or be otherwise notified that the recording has been modified based on the participant client device 340*a*'s recording customization request. This may aid in other participants confusion upon seeing a recording that has been customized.

In some embodiments, one or more portions of the recording may not be customizable for compliance purposes. For example, in a meeting that is required by law or other regulations to be recorded, if the participant requests to customize the recording for sharing, the participant may be unable to customize the compliance content in the recording. For example, the participant may be able to customize, as discussed herein, the introduction segments and/or the ending segments of the recording, however, the participant cannot customize the main segment involving the compliance content.

Figure 4:
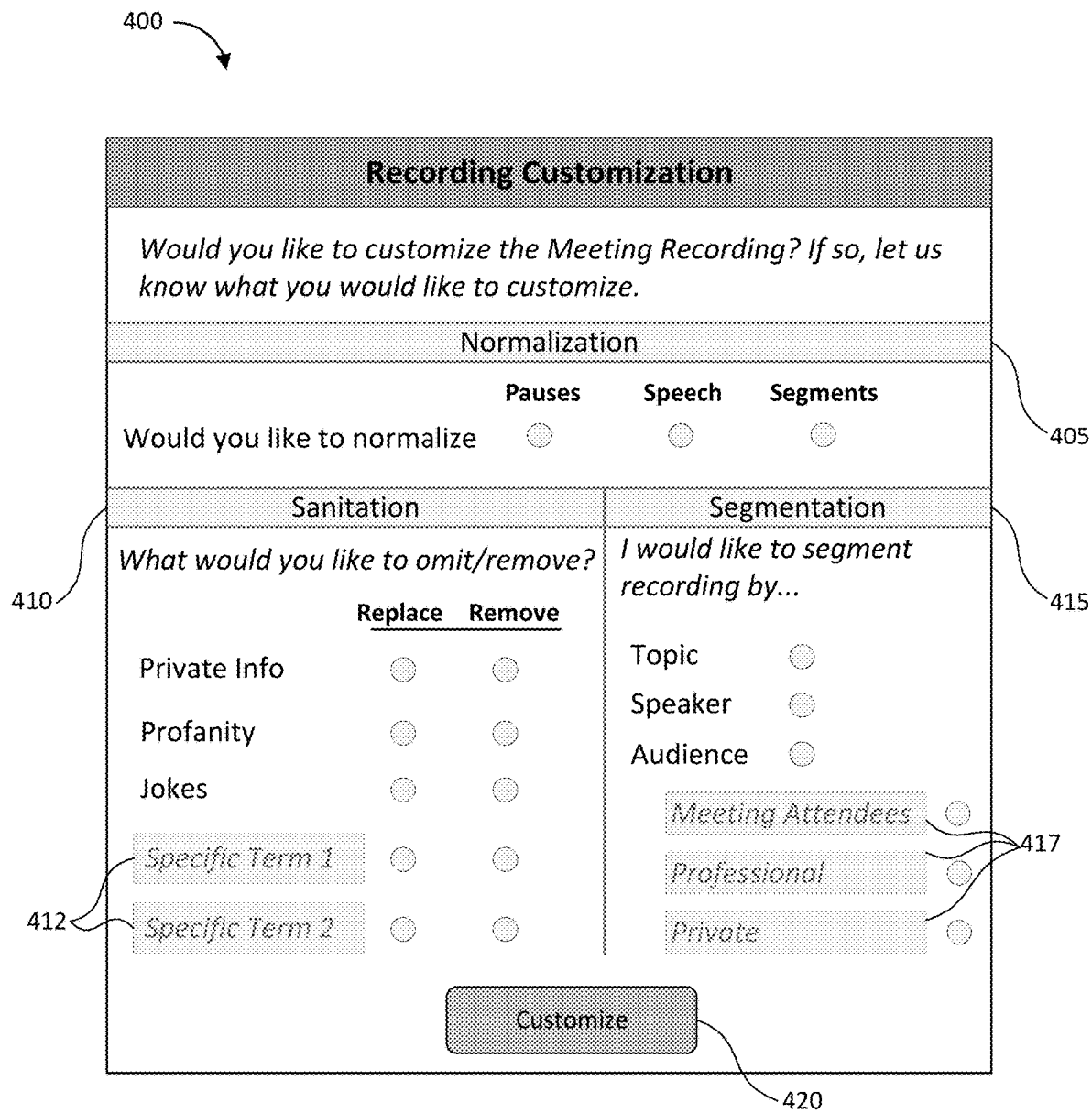
FIG. 4 illustrates a recording customization prompt, according to an embodiment herein.

Referring now to FIG. 4, a recording customization prompt 400 is provided, according to an embodiment herein. As shown, the recording customization prompt 400 may include various settings or preferences that a participant may set for customizing a recording. As noted above, the participant may be prompted to set recording customization preferences upon requesting to share a meeting recording or the participant may set the recording customization preferences at any time before, during, or after a meeting recording is generated. The recording customization preferences may be applied to a meeting recording, such to generate a customized recording according to the participant's customization preferences.

Customizing a meeting recording may involve various modifications to the content of the recording. For example, customization may include normalizing the recording, sanitizing the recording, and/or segmenting the recording. Each of these modification forms is described in greater detail below.

The recording customization prompt 400 may include a normalization pane 405. The normalization pane 405 may provide the participant various features of the recording to which normalization may be performed. Normalizing may involve modifying or adjusting features within the audio and/or video tracks within the recording such that they are uniform throughout the recording. For example, a feature may be pauses within speech. Throughout the recording, some participants may take extended pauses between sentences or there may be an extended pause while a participant pulls up a document to share during the meeting. If the participant selects to normalize pauses throughout the recording, then the instant processing functionality provided herein may identify the pauses throughout the recording, identify pauses that are longer than a threshold, and modify the long pauses such that they are under the threshold and/or the same length as the majority of other pauses within the recording. For example, the instant processing functionality may identify all the pauses within the recording and determine that the majority of the pauses are less than 1 second. During normalization, the instant processing functionality may identify long pauses that are longer than 1 second and normalize the long pauses to be less than 1 second.

Another feature that the instant processing functionality may normalize includes speech. Speech may include a speech pattern, a speech cadence or speed, or speech informalities. In one example, the feature being normalized may be speech informalities, such as the use of "um" or other verbal pauses throughout a participant's audio. The instant processing functionality may identify all uses of "um" or other verbal pauses throughout the recording and remove them from the customized recording. Other speech informalities may include vocal tics, such as humming, clearing of the throat, or yelling out a word or phrase both in and out of context.

Another example of normalizing a speech feature may include normalizing speech cadence throughout the recording. Within the recording, different participants may speak at different rates. For example, participant A associated with participant client device 340a may speak slowly while participant B associated with the participant client device 340b may speak fast. To normalize the speech cadence within the recording, the instant processing functionality may increase the speed of participant A's speech and decrease the speed of participant B's speech such that both speeches are at the same cadence.

The normalization pane 405 may also include normalizing segments. Different segments of the recording may differ in character. For example, the video tracks at different segments throughout the recording may have different lighting or the audio tracks at different segments may have different sound volumes. To normalize the segments, the instant processing functionality may identify the differences between the character of different segments (e.g., brightness, sound volume, speaker position within the recording window) and adjust the character across the segments to be uniform. For example, the instant processing functionality may adjust the brightness of different segments so that all the segments of the recording are at the same brightness. Similarly, the instant processing functionality may adjust the volume of different segments so that all the segments of the recording are at the same volume.

In some embodiments, normalizing segments within a recording may include grouping segments according to a content characteristic (e.g., topic, speaker). For example, the recording may include various segments covering different topics. Topic A may be discussed in a first segment, topic B may be discussed in a second segment, topic C may be discussed in a third segment, and topic A may be discussed again in a fourth segment. The instant processing functionality may identify the first and fourth segments as discussing topic A and organize the segments within the customized recording such that the first and fourth segments are provided sequentially. In other embodiments, the content characteristic may include a speaker. Segments containing the same speaker may be organized such to be provided sequentially or otherwise together in the customized recording.

The recording customization prompt 400 may also include a sanitation pane 410. The sanitation pane 410 may include various content that can be removed, omitted, or otherwise modified from the recording. For example, as illustrated, the sanitation pane 410 may provide options to replace or remove private information, profanity, and/or jokes from the recording. The sanitation pane 410 may also include input fields 412 for which the participant can input content that he or she wishes to customize. For example, the participant may input his or her nickname "Chuck" and indicate to remove any reference to "Chuck" throughout the recording. As will be discussed in greater detail below with respect to FIGS. 6 and 7, the instant processing functionality may identify the term "Chuck" within the audio tracks of the recording and remove it.

In another sanitation example, the participant may indicate to remove private information from the meeting recording. For example, during the beginning of the meeting participant A may have engaged in small talk, discussing her kids and the city she lives in. Upon sharing the recording, participant A may want to remove her kids' names and the name of her city. To do so, participant A may select to remove the private information from the recording. The instant processing functionality may identify content within the recording containing the private information and remove it. Identification of private information may be based on one or more keywords that are identified as personally identifiable to participant A. These keywords may be gathered from the participant client device 340a, such as for example, applications on the participant client device 340a, or the keywords may be from a profile associated with the participant client device 340a from the video conference provider 310. In still other embodiments, participant A may input keywords that he or she considers personally identifiable.

As shown, content including private information may either be replaced or removed. If the content is removed, then in some embodiments, the recording may simply skip over the removed content while in other embodiments, the recording may leave a pause or silence in place of the removed content, akin to beeping out a word during speech. In other embodiments, the content may be replaced. Replacing the content may include inserting one or more words into the audio track in place of the removed content. Following the example from above, if the participant selected to replace the nickname "Chuck," the instant processing functionality may, upon identifying the term "Chuck," replace it with a generic name such as "John" or "Jane." In some embodiments, the participant may be able to input replacements for words, such as names. For example, the participant may want to replace "Chuck" with the formal name "Charles." Upon identifying the replacement term "Charles," the instant processing functionality may replace any use of "Chuck" within the recording with "Charles."

The recording customization prompt 400 may also include a segmentation pane 415. The segmentation pane 415 may provide various preferences for segmenting the recording based on the content of a segment or an intended audience of the recording. For example, the recording may be segmented by topic, speaker, or audience (e.g., the one or more recipient groups). If the participant selects to segment by topic, the instant processing functionality may process the recording segment to identify one or more segments based on topic.

Referring now to FIGS. 5A and 5B, example segmentations of a recording 500A and recording 500B, respectively, of a virtual meeting recording is provided, according to an embodiment herein. FIG. 5A illustrates a first recording 500A. As shown, the recording 500A may include a number of different segments 502-510. For example, the recording 500A may include an introduction segment 502, a topic 1 segment 504, a topic 2 segment 506, a Questions and Answers (Q&A) segment 508, and a final comments segment 510. If a participant selects to segment the recording 500A based on topic, the instant processing functionality may process the recording 500A to identify the different segments 502-510. The instant processing functionality may identify the different segments 502-510 using a variety of techniques. For example, the instant processing functionality may analyze the recording for a switch in speaker, switch in presentation mode, or one or more keywords. In an example, the instant processing functionality may identify the introduction segment 502 as a separate segment from the topic 1 segment 502 by when a recording switches from a number of participants speaker to a single speaker sharing a screen. In another example, the instant processing functionality may analyze the frequency of use for various terms and identify when the terms change during the recording to identify different segments. In still another example, the instant processing functionality may identify one or more keywords in an audio track to indicate the start or a finish of a segment. For example, the instant processing functionality may identify the keywords "Q&A" in an audio track and identify the start of the Q&A segment 508 within the recording. Identification of terms and/or keywords within the audio tracks may be performed using one or more speech recognition techniques, such as those described below with respect to FIGS. 6 and 7.

FIG. 5B provides another example of segmenting a recording 500B. For example, as shown, the recording 500B is segmented into segments 512-522. The segments 512-522 include a small talk segment 512, a topic 1 segment 514, a break segment 516, a private segment 520, and a small talk segment 522. Each of these segments may be identified using a variety of techniques, including those discussed above. In the recording 500B, a break segment 516 is identified. The break segment 516 may be identified as a silence in audio tracks, which may correspond to an intermission in the virtual meeting. The break segment 516 may be removed if the participant selects such a preference in the normalization pane 405.

With reference to FIG. 4, one or more of the segments 502-522 may be identified and removed according to the participant's preferences in the segmentation pane 415. For example, if the participant selects to segment one or both of the recordings 500A and 500B by topic 1, then the recordings 500A and 500B may be segmented to only include the topic 1 segments 504, 514, and 518. The instant processing functionality may generate a customized version of the recording 500A that only includes the topic 1 segment 504 and a customized version of the recording 500B that only includes the topic 1 segments 514 and 516.

In another example, if the participant selects to segment the recordings 500A and 500B by speaker, the instant processing functionality may identify the segments 502-522 within the recordings 500A and 500B that only include the selected speaker. For example, if the participant selects to segment by speaker, the participant may be prompted to input a desired speaker. The participant may input "Professor X." Based on this input, the instant processing functionality may analyze the recordings 500A and 500B for segments that include Professor X. In this example, Professor X may be the main presenter in the topic 2 segment 506 and also present in the final comments segment 510 of the recording 500A. As such, the instant processing functionality may generate a customized recording that includes only the topic 2 segment 506 and the final comments segment 510. Since the recording 500B does not include Professor X, no customized recording may be generated based off of the recording 500B.

It should be understood that customization of a recording may be performed on a recording-by-recording basis or may be performed on a grouping of recordings, such as performed on both of the recordings 500A and 500B. By allowing customization of a grouping of recordings, a participant can easily customize a group of related recordings without having to go through each recording individually. In some embodiments, the customized recordings for each recording in a group of related recordings may be combined into a single comprehensive customized recording.

In a further example, the participant may select to segment one or both of the recordings 500A and 500B by a desired recipient group or audience. As shown by the segmentation pane 415, the participant may select to segment by audience, and then the participant may input the name, email address, or other identifying information for a recipient into input fields 417. The instant processing functionality may then segment the recordings 500A and/or 500B based on the selected recipient. For example, if the participant selects to segment the recordings 500A and 500B by audience and inputs his or her manager's email address into the input field 417, then the instant processing functionality may segment the recordings 500A and 500B to identify segments that are applicable. For example, the instant processing functionality may identify segments which include one or more keywords associated with private information of meeting participants or small talk (e.g., personally identifiable information such as names, locations, addresses, credit card information, hobbies, etc.). In such a case, the instant processing functionality may identify an introduction segment 502, a small talk segment 512, a private segment 520, and a small talk segment 522 from the recordings 500A and 500B as containing private information. Based on this, the instant processing functionality may generate a customized recording for the recording 500A that removes the introduction segment 502 and a customized recording for the recording 500B that removes the small talk segment 512, the private segment 520, and the small talk segment 522.

In an alternative approach, the instant processing functionality may identify the segments that include content that is considered to be "professional." Content that is considered to be "professional" may include content that includes keywords associated with the topic of the meeting, content in which a main speaker is presenting, content in which only one participant is speaking, content in which screens are shared, or content that does not include keywords associated with personally identifiable information associated with one or more meeting participants. For example, the instant processing functionality may identify topic 1 segment 504, topic 2 segment 506, the Q&A segment 508, and the final comments segment 510 of the recording 500A as "professional content." As such, the instant processing functionality may generate a customized recording that only includes segments 504-510 based on the selected recipient of the recording. Similarly, for the recording 500B, the instant processing functionality may identify topic 1 segments 514 and 518 as containing professional content and generate a customized version of the recording only including segments 514 and 518 based on the selected recipient.

Although the above examples are discussed with respect to a single customization option, it should be understood that a recording may be customized using more than one customization option. For example, the participant may select to segment the recording 500A, normalize the recording 500A, and remove any profanity within the recording 500A. As such, the customized version of the recording 500A may be profanity-free, with all pauses removed, and segmented to only include content related to topic 1.

Once the participant has selected his or her customization preferences, the participant can select the customize selection 420. Upon selection of the customize selection 420, the instant processing functionality may process the recording(s) according to the selected customization settings to generate a customized recording. Customization of the recording may be nearly instantaneous.

In some embodiments, instant processing functionality may employ one or more machine learning (ML) techniques. For example, the instant processing functionality may use ML to identify organizational behavior for participants that are part of the same organization. That is, the instant processing functionality may identify one or more customization preferences for recordings based on the organization. In an example embodiment, the instant processing functionality may identify that participants that are part of the same organization always modify a recording in the same manner, for example, by removing the term "Project Ladybug" from every recording. Based on this, the instant processing functionality may identify the term "Project Ladybug" in a recording associated with the organization for customization, regardless if the participant identifies the term as part of his or her customization preferences.

Figure 6:
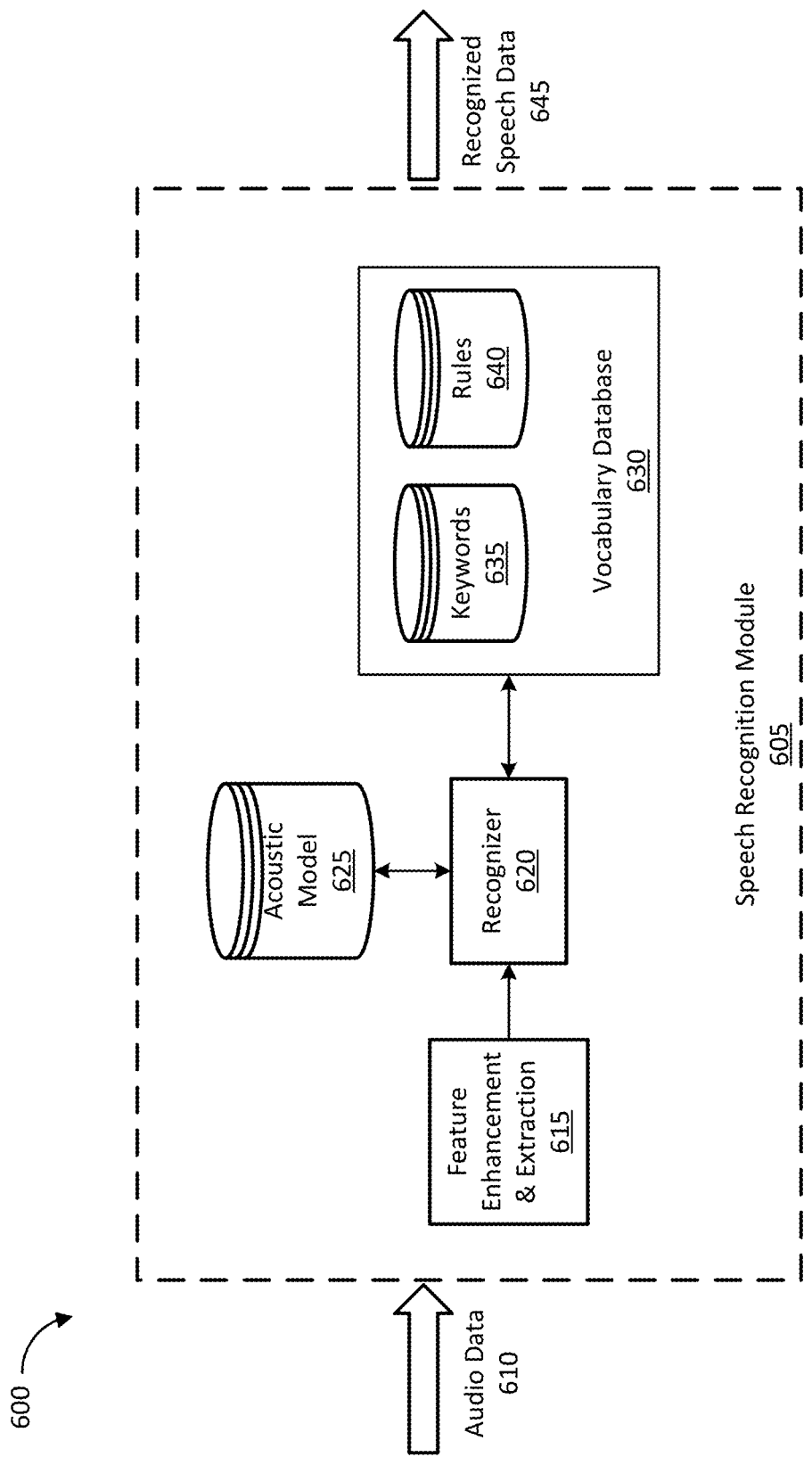
FIG. 6 illustrates an example speech recognition system that may be locally or remotely executed, according to an embodiment herein.

Turning now to FIG. 6, an example speech recognition system 600 that may be used for the instant processing functionality on a recording is provided. The speech recognition system 600 may be executed locally or remotely. For example, the speech recognition system 600 may be locally executed on a client device, such as the client device 340a, however, in other embodiments, the speech recognition system 600 may be cloud-based and/or remotely executed by a video conference provider, such as the video conference provider 310, or a third party system.

Figure 7:
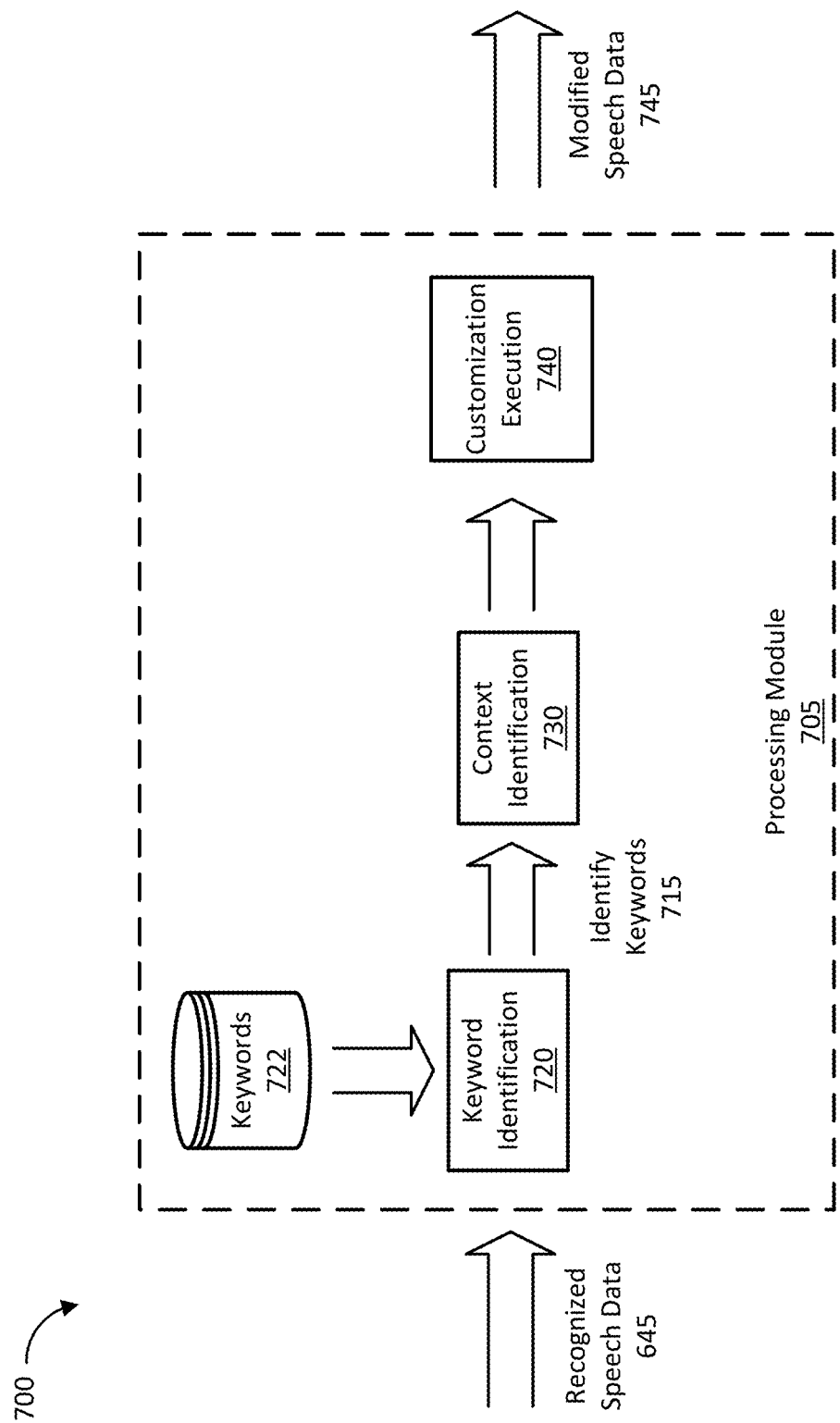
FIG. 7 illustrates an example off-the-record system that may be locally or remotely executed, according to an embodiment herein.

The speech recognition system 600, along with the customization system 700 described in greater detail with respect to FIG. 7, may be used to perform one or more of the instant processing functions described herein. For example, in some embodiments, the speech recognition system 600 may be used to identify keywords or speech patterns for normalization or sanitization process. For example, the speech recognition system 600 may identify keywords to remove or replace during a sanitization process (e.g., profanity, jokes, or private information). In other embodiments, the speech recognition system 600 may be used to identify personally identifiable information relating to a participant in the audio tracks. As discussed above, identification of personally identifiable information may be used to determine if the content of a segment is professional or private. In still further embodiments, the speech recognition system 600 may be used to process the audio tracks to generate a transcript of the meeting recording.

To perform speech recognition, the speech recognition system 600 may include a speech recognition module 605. The speech recognition module 605 may receive audio data 610. The audio data 610 may correspond to audio captured by the client device 340a, for example by a microphone. In other embodiments, the audio data 610 may be received from the video conference provider 310. The audio data 610 may be a recording of an audio track or may be a transcript of the audio track. The speech recognition module 605 may be or include a speech recognition system or model as known in the art. The following is an example speech recognition module following an example speech recognition process, however, it should be understood that other speech recognition modules or processes may be used.

Once the audio data 610 is received by the speech recognition module 605, the audio data 610 may be processed by a feature enhancement and extraction module 615. The feature enhancement and extraction module 615 may analyze the audio data for features corresponding to words and then enhance and extract any identified features. The identified features may correspond to audio waveforms present in human speech.

The speech recognition module 605 may also include a recognizer 620. The recognizer 620 may receive the identified features from the audio data 610. The recognizer 620 may employ an acoustic model 625 and a vocabulary database 630 to determine or associate the identified features in the audio data 610 to one or more words.

In an example embodiment, the acoustic model 625 may analyze the raw audio waveforms in the identified features and determine a corresponding phoneme for each waveform.

In some embodiments, this is performed at the character or subword level. The vocabulary database 630 may be a language model. The vocabulary database 630 may include a rules database 640 and a word database 635. The rules database 640 may provide various rules for speech, allowing the recognizer to discard any association of identified features (e.g., audio waveforms) to phonemes that are improbable given the constraints of proper grammar and the topic of discussion. Once an appropriate mapping of the identified features to phonemes is generated, the recognizer 620 may determine words associated with the phonemes. The words may be based on the words database 635.

Once the phonemes are associated with respective words, recognized speech data 645 is generated. It should be understood that this process may be performed nearly instantaneously. For example, the speech recognition module 605 may generate the recognized speech data 645 during the meeting as the audio streams are being received by the video conference provider 310 or another system that is hosting the speech recognition system 600. The recognized speech 645 may be then used to perform one or more instant processing functions, such sanitizing, normalizing, and/or segmenting a recording.

Turning now to FIG. 7, a customization system 700 is provided. The customization system 700 may include processing module 705 that is used to perform one or more of the privatization functions described herein. For example, in one case, the recognized speech 645 may be received from the speech recognition system 600 to customize the associated audio track according to a participant's customization preferences.

The recognized speech 645 may be received by the keyword identification system 720. The keyword identification system 720 may identify one or more keywords in the recognized speech data 745. The database of known keywords 722 may be queried to identify any keywords in the track of recognized speech data 645. Keywords in the keyword database 722 may be based on the participant for which the instant processing functionality is being invoked. For example, if the instant processing functionality is invoked for the client device 340*a*, then the keywords in the keyword database 722 may relate to or be based on participant A, who corresponds to the client device 340*a*. The keywords may include words relating to the identity of participant A or personally identifiable information about participant A, such as the first and last name of participant A. In some cases, the keywords may include an office or location of participant A. Other keywords may include the names of projects, areas, or topics that participant A is involved in. In some embodiments, keywords may include one or more emotion expressions, such as a distinct laughter, or identifiable speech characteristics, such as an accent.

The keywords in the keyword database 722 may be gathered from participant A or from the client device 340*a*. For example, upon enabling the instant processing functionality, participant A may be prompted to input personally identifiable keywords that the processing module 705 should monitor the virtual meeting for (e.g., nickname). In other embodiments, the processing module 705 may receive some or all the keywords from the participant's profile with the video conference provider 310. In still other embodiments, the processing module 705 may gather keywords from applications on the client device 340*a*. If the processing module 705 has permission to search other applications on the client device 340*a*, the processing module 705 may gather keywords from folders, calendars, emails, or other applications running on the client device 340*a*.

The keywords being based on the participant A may be used by the instant processing functionality to identify private or personally identifiable content within the recording. As such, in some embodiments the keywords may not be only based on the participant A but may include keywords associated with other participants. In some cases, each participant associated with the video conference provider 310 may have a respective keyword database 722. If a participant is present in a recording, the instant processing functionality may identify the participant's presence and query that participant's keyword database 722.

The keywords in the keyword database 722 may also include keywords relating to topics of the virtual meeting. For example, the instant processing functionality may identify one or more keywords from a meeting invitation and add the keywords to the keyword database 722. Keywords relating to topics of a virtual meeting may assist the instant processing functionality with identifying segments of a recording.

It should be understood that a keyword may include more than one word. For example, "Project Alpha" may be a "keyword" as indicating that the phrase "Project Alpha" is a personally identifiable characteristic for participant A. Depending on various implementations, multi-word keywords may be treated as a single keyword or as multiple associated keywords. Further, a keyword may have multiple different forms. For example, a keyword may be a verb, which may be spelled different depending on context, e.g., it is conjugated differently depending on tense, subject, etc. Thus, a keyword may include variants of a base word, e.g., "look for," "looking for," and "looked for." In some examples each of these may be a distinct keyword, while in other examples, the variants may be associated with a base term, e.g., "look," that is used as the keyword. However, any suitable approach to recognizing keywords may be used.

If one or more keywords 715 is recognized, the processing module 705 then may identify a context 730 associated with the keyword 715. In this example, to identify a context, the processing module 705 may employ a trained machine learning ("ML") technique to semantically analyze the speech or transcript associated with the identified keyword 715 to determine additional related keywords and/or descriptors. To perform the analysis, the trained ML, technique may be provided the keyword(s) and a predetermined number of words near the keyword, e.g., preceding and following the keyword(s), such as five to ten words preceding and following the keyword(s). Words such as articles (e.g., "a", "the") or prepositions such as "of" or "for" may be omitted from the word count in some examples.

Since people may use jargon or colloquial terms to refer to particular actions, the context identification 730 functionality may normalize recognized words to specific meanings. For example, the terms "kids," "offspring," "kiddos," "little ones," etc. all refer to children. Thus, the context identification 730 functionality may map such terms to have a single meaning (e.g., children). Such mappings may be provided for multiple different phrases and corresponding terms. Similarly, synonyms or words related to keywords may also be identified.

Once the context identification 730 has identified the one or more keywords 715 and identified the context of the identified keywords 715, the processing module 705 may perform a customization execution 740. The processing module 705 may determine, based on the identification of the keywords 715, and the context of the keywords, that the keywords 715 include profanity. Based on the participant's customization preferences, the processing module 705 may receive instructions to remove any keywords 715 including profanity. Based on these instructions, the customization execution 740 may remove the keywords 715 including profanity. In another example, the customization preferences may be to remove private information. Based on these preferences, the processing module 705 may receive instructions to remove a portion of the audio data corresponding to private information associated with one or more participants in the recording. Based on these instructions, the customization execution 740 may identify portions of the audio data as including keywords 715 corresponding to private information associated with the participants. For example, the context identification 730 may identify the keywords 715 that include private information and the customization execution 740 may identify the beginning of a sentence which includes the private information keywords 715 and an ending sentence that includes the private information keywords 715. One or more sentences may be identified. This may be a portion of the audio data that includes keywords 715 associated with the private information. The customization execution 740 may then remove the portion of the audio data.

The customization execution 740 may process the keywords 715 in the audio data to generate modified speech data 745. The modified speech data 745 may be the audio data 610 that has been processed per a participant's customization preferences. For example, if the participant indicated to remove jokes from the recording, the customization execution 740 may generate the modified speech data 745 having all the jokes removed.

The customization system 700 may be used to generate a transcript and/or edit a transcript of the meeting recording. For example, if a recording is customized to modify or remove content, such as jokes, profanity, names, etc., a corresponding transcript may include a modified transcript in which the content is modified or removed from the text. Similarly, if the customized recording only contains certain segments of the recording, then the transcript may only include transcription of the audio tracks for the segments of the customized recording. The segments that were omitted may not be transcribed in the transcription. A transcription for a customized recording may be considered a customized transcription if the customization was performed on the audio track(s) of the recording.

The customization of a recording by the instant processing functionality may be nearly instantaneous. For example, the participant may select to share a customized recording based on his or her customization preferences. The instant processing functionality may generate the customized recording nearly instantly. In some embodiments, the instant processing functionality may process a recording based on a participant's customization preferences and provide the participant a quick review of the customized content.

Figure 8:
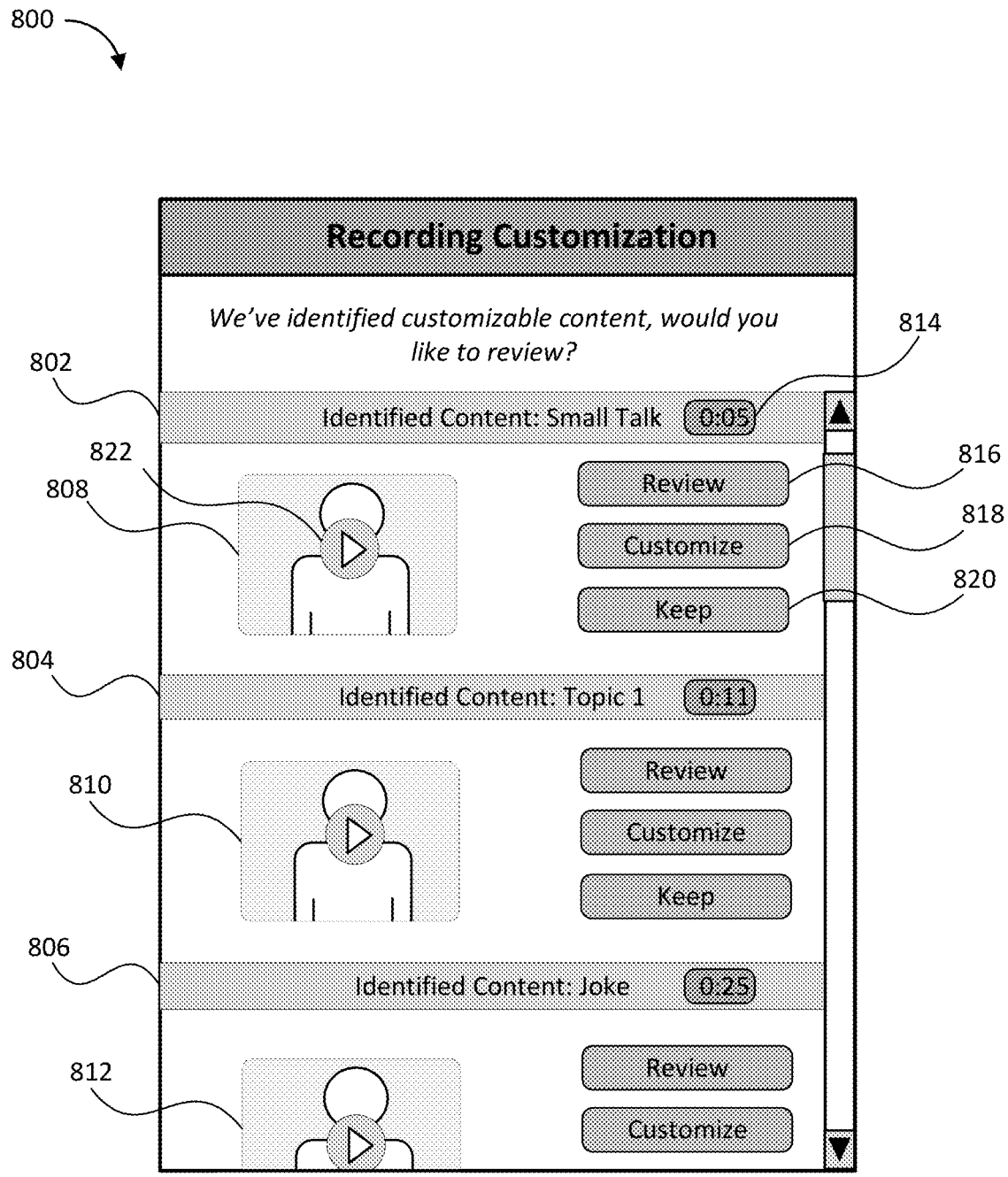
FIG. 8 illustrates a prompt for instant review of recording customization, according to an embodiment herein.

Referring now to FIG. 8, a prompt 800 for instant review of recording customization is provided, according to an embodiment herein. The prompt 800 may provide a participant with quick review of content that is identified for customization. For example, the instant processing functionality may identify content within a recording based on the participant's customization preferences and provide the prompt 800 to the participant for verification to customize the content. The prompt 800 may provide portions of the recording including the identified content. As shown, the instant processing functionality may identify content relating to private information preferences (small talk content) provided in pane 802, content relating to topic 1 provided in pane 804, and content relating to a joke provided in pane 806. In each of the panes 802-806, a clip of the identified content from the recording may be provided. For example, the pane 802 may provide clip 808, the pane 804 may provide clip 810, and the pane 806 may provide clip 812. Each of the clips may provide a segment of the recording containing the identified content. If the user selects the play button 822, the clip may play the segment of the identified content. The segment may not be customized such that the participant can review the original content of the recording. In some embodiments, the clip 812 may a sped-up or compressed replay of the recording content to provide for fast review.

With references to pane 802, the clip 808 provided may be identified based on the participant's customization preferences. For example, the participant may indicate to remove personally identifiable information (e.g., private information) from a recording. The clip 808 may include a segment of the recording that includes small talk. To identify the clip 808, the instant processing functionality may identify the small talk because it includes personally identifiable information. For example, the customization system 700 may identify one or more keywords 715 that include private information and the customization execution 740 may identify clip 808 as including customizable content. The clip 808 may be identified such to be customized to modify the one or more keywords 715 based on the participant's customization preferences.

Each of the panes 802-806 may include a time 814 at which identified content occurs in the recording. This may allow the participant to orient the clip within the overall recording. Each of the panes 802-806 may also include a plurality of options for the identified content. For example, the prompt 800 may include a review selection 816, a customize selection 818, and a keep selection 820. The review selection 816 may allow the participant to review the identified content as customized. For example, upon selection of the review selection 816, the clip 808 may play a customized version of the clip. For example, clip 808 may provide a customized portion of the recording in which the personally identifiable keywords in the small talk are removed.

If upon review the participant determines that he or she wishes to customize the identified content, the participant can select the customize selection 818. Selecting the customize selection 818 may customize the identified content according to the participant's customization preferences. In contrast, if the participant determines that he or she does not wish to customize the identified content, the participant may select the keep selection 820. The keep selection 820 may cause the instant processing functionality to keep the identified content as the original content and not apply the customization preferences.

Providing the participant the ability to review identified content may allow the participant increased control over which segments of a recording that are customized. For example, the prompt 800 may allow the participant to customize some segments of the recording, while leaving other segments as the original recording. It should be understood, however, that in some embodiments, the instant processing functionality may customize a recording and merely provide a participant review of the customized content after the customization is performed. In some embodiments, the customization is performed without participant review of the customized content.

Figure 9:
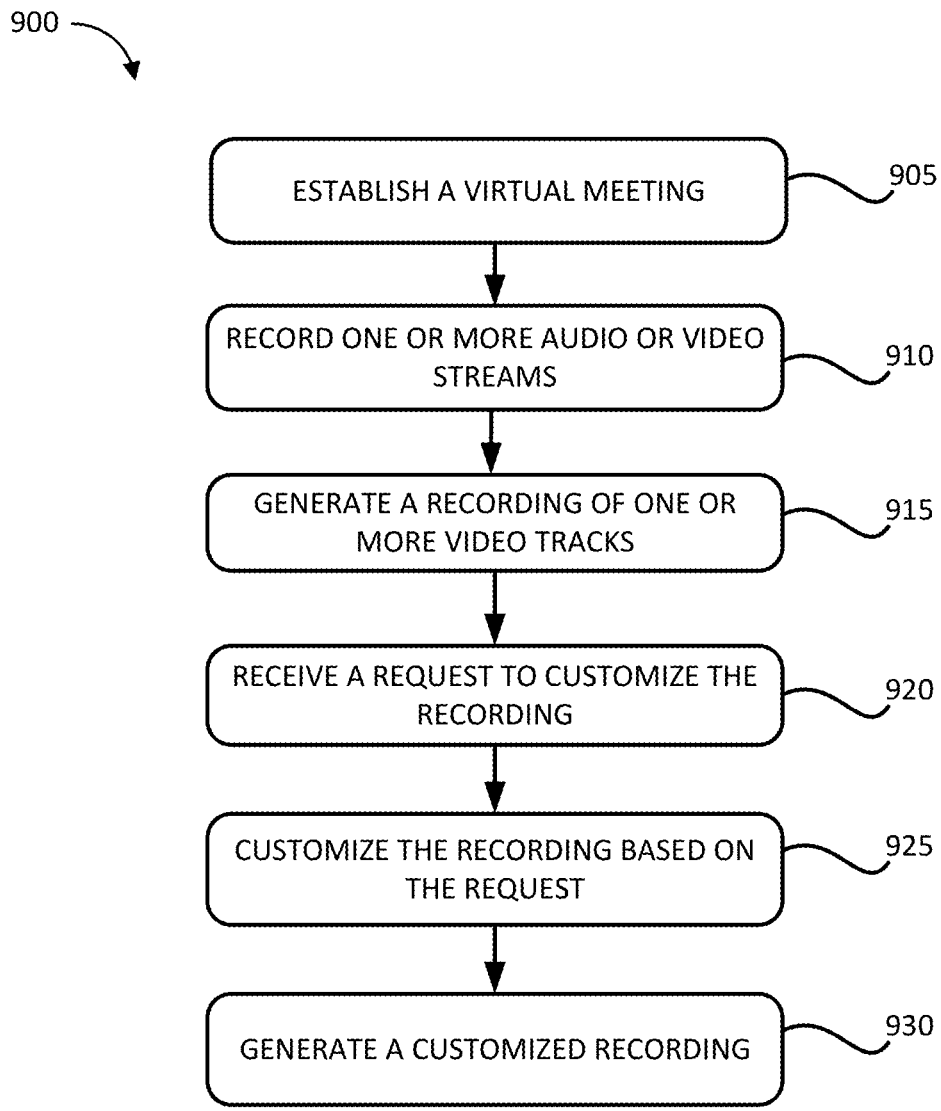
FIG. 9 illustrates an exemplary method for providing instant processing of virtual meeting recordings, according to an embodiment herein.

Referring now to FIG. 9, a flowchart of an example method 900 for providing instant processing of virtual meeting recordings is provided. The description of the method 900 in FIG. 9 will be made with reference to FIGS. 3-8, however any suitable system according to this disclosure may be used, such as the example systems 100 and 200, shown in FIGS. 1 and 2.

The method 900 may include step 905. At step 905, a virtual meeting may be established. The virtual meeting may be established by a video conference provider, such as the video conference provider 310. The virtual meeting may include a plurality of participants, each of which may exchange one or more audio or video streams during the virtual meeting.

At step 910, the method 900 may include recording the one or more audio or video streams from the plurality of participants. Recording of the one or more audio or video streams may be responsive to an indication from one of the plurality of participants. At step 915, the method 900 may include generating a recording of one or more audio or video tracks. The one or more audio or video tracks may correspond to the one or more audio or video streams exchanged during the virtual meeting. In one configuration, each audio stream and each video stream from each participant may be recorded separately to allow for individualized review and customization.

The method 900 may include receiving, from a first client device, a request to customize the recording, at step 920. The request may include an identification of customizable content and a modification action. For example, as discussed above with respect to FIG. 4, a participant may set customization preferences for a recording. In some embodiments, the modification action may include segmenting the recording, sanitizing the content within the recording, or normalizing the recording.

At step 925, the method 900 may include customizing the recording based on the identified customizable content and the modification action. In one example, the modification action may be segmenting the recording. In such an example, the method may include identifying segmentation content, determining suitable boundaries for one or more segments based on the segmentation content, and segmenting the recording into the one or more segments. Examples of segmentation content may include at least one of a topic within the recording, a speaker during the recording, or an audience for the customized recording. In another example embodiment, the modification action may include normalizing the recording. In such an example, the method 900 may include identifying normalization content and modifying the normalization content. An example of normalization content may include pauses with audio tracks of the recording, and modifying the normalization content may include removing the pauses from the recording. Another example of normalization content may include inconsistent speech within the audio tracks of the recording, and modifying the normalization tracks may include modifying the inconsistent speech to be consistent throughout the customized recording.

At step 930, the method 900 may include generating a customized recording based on applying the modification action to the identified customizable content. In some embodiments, the method 900 may also include automatically customizing the recording responsive to termination of the virtual meeting. Optionally, the method 900 may include receiving, from a first client device, an indication to share the customized recording with one or more recipient client devices, and transmitting the customized recording to the one or more recipient client devices.

Figure 10:
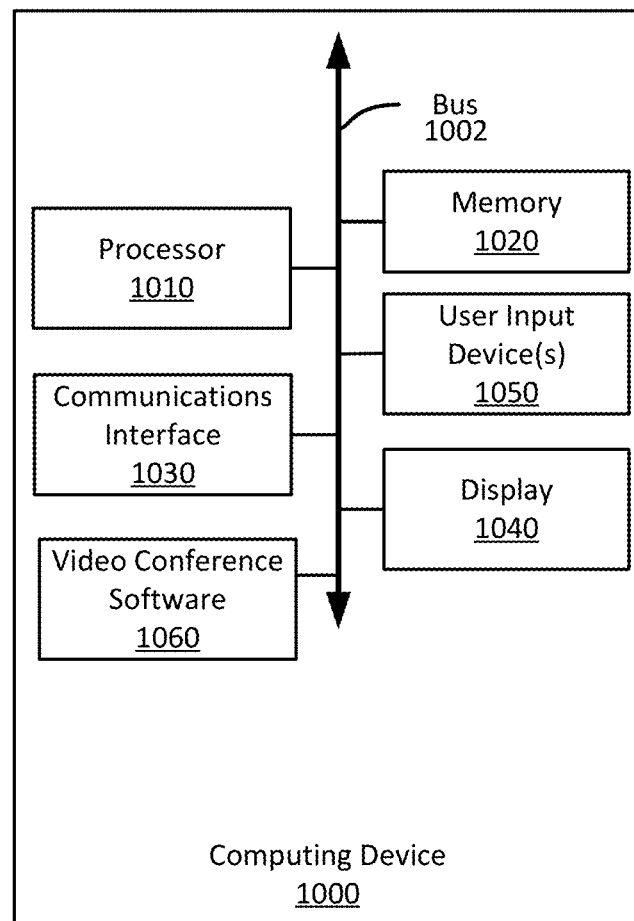
FIG. 10 shows an example computing device suitable for providing instant processing of virtual meeting recordings, according to this disclosure.

Referring now to FIG. 10, FIG. 10 shows an example computing device 1000 suitable for use in example systems or methods providing instant processing of virtual meeting recordings. The example computing device 1000 includes a processor 1010 which is in communication with the memory 1020 and other components of the computing device 1000 using one or more communications buses 1002. The processor 1010 is configured to execute processor-executable instructions stored in the memory 1020 to perform one or more methods for providing instant processing of virtual meeting recordings, such as part or all of the example method 900, described above with respect to FIG. 9. The computing device, in this example, also includes one or more user input devices 1050, such as a keyboard, mouse, touchscreen, video input device (e.g., one or more cameras), microphone, etc., to accept user input. The computing device 1000 also includes a display 1040 to provide visual output to a user.

The computing device 1000 also includes a communications interface 1030. In some examples, the communications interface 1030 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "of" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

EXAMPLES

These illustrative examples are mentioned not to limit or define the scope of this disclosure, but rather to provide examples to aid understanding thereof. Illustrative examples are discussed above in the Detailed Description, which provides further description. Advantages offered by various examples may be further understood by examining this specification As used below, any reference to a series of examples is to be understood as a reference to each of those examples disjunctively (e.g., "Examples 1-4" is to be understood as "Examples 1, 2, 3, or 4").

Example 1 is a system comprising: a non-transitory computer-readable medium; a communications interface; and a processor communicatively coupled to the non-transitory computer-readable medium and the communications interface, the processor configured to execute processor-executable instructions stored in the non-transitory computer-readable medium to: establish a virtual meeting having a plurality of participants, each participant of the plurality of participants exchanging one or more audio or video streams via the virtual meeting; record, responsive to an indication from one of the plurality of participants, the one or more audio or video streams from the plurality of participants; generate a recording of one or more audio or video tracks corresponding to the one or more audio or video streams exchanged during the virtual meeting; receive, from a first client device, a request to customize the recording, the request comprising an identification of customizable content and a modification action; generate a customized recording based on applying the modification action to the identified customizable content.

Example 2 is the system of any previous or subsequent example, wherein the modification action comprises one or more of: segmenting the recording; sanitizing the content within the recording; or normalizing the recording.

Example 3 is the system of any previous or subsequent example, wherein the processor is configured to execute further processor-executable instructions stored in the non-transitory computer-readable medium to: provide, to the first client device, a preview of a section of the customized recording, wherein the section comprises the identified customizable content; receive, from the first client device, an indication to customize the section according to the modification action; and modify the section according to the modification action in the customized recording.

Example 4 is the system of any previous or subsequent example, wherein the processor is configured to execute further processor-executable instructions stored in the non-transitory computer-readable medium to: perform speech recognition on an audio track associated with the first client device; identify, based on the speech recognition, sanitation content; and modify the sanitation content in the customized recording.

Example 5 is the system of any previous or subsequent example, wherein the processor-executable instructions for modifying the sanitation content causes the processor to execute further processor-executable instructions stored in the non-transitory computer-readable medium to: determine, based on customization settings, whether to replace the sanitation content or remove the sanitation content from the customized recording.

Example 6 is the system of any previous or subsequent example wherein the sanitation content comprises at least one of: personally identifiable information associated with the first client device; profanity; or a joke.

Example 7 is the system of any previous or subsequent example, wherein the processor is configured to execute further processor-executable instructions stored in the non-transitory computer-readable medium to: determine, based on customization settings, an audience for the customized recording; and adjusting the modification action based on the audience.

Example 8 is the system of any previous or subsequent example, wherein the processor is configured to execute further processor-executable instructions stored in the non-transitory computer-readable medium to: transmit, to a client device associated with the audience, the customized recording.

Example 9 is a method comprising: establishing, by a video conference provider, a virtual meeting having a plurality of participants, each participant of the plurality of participants exchanging one or more audio or video streams via the virtual meeting; recording, responsive to an indication from one of the plurality of participants, the one or more audio or video streams from the plurality of participants; generating a recording of one or more audio or video tracks corresponding to the one or more audio or video streams exchanged during the virtual meeting; receiving, from a first client device, a request to customize the recording, wherein the request comprises an identification of customizable content and a modification action; and generating a customized recording based on applying the modification action to the identified customizable content.

Example 10 is the method of any previous or subsequent example, wherein the modification action comprises one or more of: segmenting the recording; sanitizing the content within the recording; or normalizing the recording.

Example 11 is the method of any previous or subsequent example, wherein modification action comprises segmenting the recording, and the method further comprises: identifying segmentation content; determining suitable boundaries for one or more segments based on the segmentation content; and identifying one or more segments in the recording.

Example 12 is the method of any previous or subsequent example, wherein the segmentation content comprises at least one of: a topic within the recording; a speaker during the recording; or an audience for the customized recording.

Example 13 is the method of any previous or subsequent example, wherein modification action comprises normalizing the recording, and the method further comprises: identifying normalization content; and modifying the normalization content.

Example 14 is the method of any previous or subsequent example, wherein the normalization content comprises pauses within the audio tracks of the recording, and modifying the normalization content comprises removing the pauses from the customized recording.

Example 15 is the method of any previous or subsequent example, wherein the normalization content comprises inconsistent speech within the audio tracks of the recording, and modifying the normalization content comprises modifying the inconsistent speech to be consistent throughout the customized recording.

Example 16 is a non-transitory computer-readable medium comprising processor-executable instructions configured to cause one or more processors to: establish a virtual meeting having a plurality of participants, each participant of the plurality of participants exchanging a one or more audio or video streams via the virtual meeting; record, responsive to an indication from one of the plurality of participants, the one or more of the audio or video streams from the plurality of participants; generate a recording of one or more audio or video tracks corresponding to the one or more audio or video streams exchanged during the virtual meeting; receive, from a first client device, a request to customize the recording, the request comprising an identification of customizable content and a modification action; and generate a customized recording based on applying the modification action to the identified customizable content.

Example 17 is the non-transitory computer-readable medium of any previous or subsequent example, wherein modification action comprises one or more of: segmenting the recording; sanitizing the content within the recording; or normalizing the recording.

Example 18 is the non-transitory computer-readable medium of any previous or subsequent example, wherein the process-executable instructions for customizing the recording cause the processor to execute further processor-executable instructions stored in the non-transitory computer-readable medium to: automatically customize the recording responsive to termination of the virtual meeting.

Example 19 is the non-transitory computer-readable medium of any previous or subsequent example, wherein the processor is configured to execute further processor-executable instructions stored in the non-transitory computer-readable medium to: receive, from the first client device, an indication to share the customized recording with one or more recipient client devices; and transmit, to the one or more recipient client devices, the customized recording.

Example 20 is the non-transitory computer-readable medium of any previous or subsequent example, wherein the processor is configured to execute further processor-executable instructions stored in the non-transitory computer-readable medium to: provide, to the first client device, a replay of one or more sections of the customized recording, wherein the replay comprises a prompt that provides a selection to remove the one or more sections of the customized recording.

Example 21 is the non-transitory computer-readable medium of any previous or subsequent example, wherein the processor-executable instructions for identifying the customizable content further the processor to execute further processor-executable instructions stored in the non-transitory computer-readable medium to: determine, using machine learning, past content that was modified during past customized recordings generated for the first client device; and identify the past content as customizable content.

Example 22 is the non-transitory computer-readable medium of any previous or subsequent example, wherein the modification action comprises segmenting the recording and the processor is configured to execute further processor-executable instructions stored in the non-transitory computer-readable medium to: identify suitable boundaries from a plurality of segments within the recording; determine, based on customization settings, one or more segments from the plurality of segments to remove from the customized recording; remove the one or more segments from the customized recording; generate a summarization of the one or more removed segments; and add the summarization of the one or more removed segments to the customized recording.

That which is claimed is:

1. A system comprising:
a non-transitory computer-readable medium;
a communications interface; and
a processor communicatively coupled to the non-transitory computer-readable medium and the communications interface, the processor configured to execute processor-executable instructions stored in the non-transitory computer-readable medium to:
  establish a virtual meeting having a plurality of participants, each participant of the plurality of participants exchanging one or more audio or video streams via the virtual meeting;
  record the one or more audio or video streams from the plurality of participants;
  generate a recording of one or more audio or video tracks corresponding to the one or more audio or video streams exchanged during the virtual meeting;
  receive, from a first client device, a request to customize the recording, the request comprising an identification of customizable content and a modification action;
  provide, to the first client device, a preview of a section of the modified recording, wherein the section comprises the identified customizable content;
  receive, from the first client device, an indication to customize the section according to the modification action;
  modify the section according to the modification action in the modified recording; and
  modify the recording based on applying the modification action to the identified customizable content.

2. The system of claim 1, wherein the modification action comprises one or more of:
segmenting the recording;
sanitizing the content within the recording; or
normalizing the recording.

3. The system of claim 1, wherein the processor is configured to execute further processor-executable instructions stored in the non-transitory computer-readable medium to:
perform speech recognition on an audio track associated with the first client device;
identify, based on the speech recognition, sanitation content; and
modify the sanitation content in the modified recording.

4. The system of claim 3, wherein the processor-executable instructions for modifying the sanitation content causes the processor to execute further processor-executable instructions stored in the non-transitory computer-readable medium to:
determine, based on customization settings, whether to replace the sanitation content or remove the sanitation content from the modified recording.

5. The system of claim 3 wherein the sanitation content comprises at least one of:
personally identifiable information associated with the first client device;
profanity; or
a joke.

6. The system of claim 5, wherein the processor is configured to execute further processor-executable instructions stored in the non-transitory computer-readable medium to:
determine, based on customization settings, an audience for the modified recording; and
adjusting the modification action based on the audience.

7. The system of claim 6, wherein the processor is configured to execute further processor-executable instructions stored in the non-transitory computer-readable medium to:
transmit, to a client device associated with the audience, the modified recording.

8. A method comprising:
establishing, by a video conference provider, a virtual meeting having a plurality of participants, each participant of the plurality of participants exchanging one or more audio or video streams via the virtual meeting;
recording the one or more audio or video streams from the plurality of participants;
generating a recording of one or more audio or video tracks corresponding to the one or more audio or video streams exchanged during the virtual meeting;
receiving, from a first client device, a request to customize the recording, wherein the request comprises an identification of customizable content and a modification action;
provide, to the first client device, a preview of a section of the modified recording, wherein the section comprises the identified customizable content;
receive, from the first client device, an indication to customize the section according to the modification action;
modify the section according to the modification action in the modified recording and
modifying and replacing the recording based on applying the modification action to the identified customizable content.

9. The method of claim 8, wherein the modification action comprises one or more of:
segmenting the recording;
sanitizing the content within the recording; or
normalizing the recording.

10. The method of claim 9, wherein modification action comprises segmenting the recording, and the method further comprises:
identifying segmentation content;
determining suitable boundaries for one or more segments based on the segmentation content; and
identifying one or more segments in the recording.

11. The method of claim 10, wherein the segmentation content comprises at least one of:
a topic within the recording;
a speaker during the recording; or
an audience for the modified recording.

12. The method of claim 11, wherein modification action comprises normalizing the recording, and the method further comprises:
identifying normalization content; and
modifying the normalization content.

13. The method of claim 12, wherein the normalization content comprises pauses within the audio tracks of the recording, and modifying the normalization content comprises removing the pauses from the modified recording.

14. The method of claim 12, wherein the normalization content comprises inconsistent speech within the audio tracks of the recording, and modifying the normalization content comprises modifying the inconsistent speech to be consistent throughout the modified recording.

15. A non-transitory computer-readable medium comprising processor-executable instructions configured to cause one or more processors to:
establish a virtual meeting having a plurality of participants, each participant of the plurality of participants exchanging a one or more audio or video streams via the virtual meeting;
record the one or more of the audio or video streams from the plurality of participants;
generate a recording of one or more audio or video tracks corresponding to the one or more audio or video streams exchanged during the virtual meeting;
receive, from a first client device, a request to customize the recording, the request comprising an identification of customizable content and a modification action;
provide, to the first client device, a preview of a section of the modified recording, wherein the section comprises the identified customizable content;
receive, from the first client device, an indication to customize the section according to the modification action;
modify the section according to the modification action in the modified recording; and
modify and replace the recording based on applying the modification action to the identified customizable content.

16. The non-transitory computer-readable medium of claim 15, wherein modification action comprises one or more of:
segmenting the recording;
sanitizing the content within the recording; or
normalizing the recording.

17. The non-transitory computer-readable medium of claim 15, wherein the processor-executable instructions for customizing the recording cause the processor to execute further processor-executable instructions stored in the non-transitory computer-readable medium to:
automatically customize the recording responsive to termination of the virtual meeting.

18. The non-transitory computer-readable medium of claim 15, further comprising processor-executable instructions configured to cause the one or more processors to:
  receive, from the first client device, an indication to share the modified recording with one or more recipient client devices; and
  transmit, to the one or more recipient client devices, the modified recording.

19. The non-transitory computer-readable medium of claim 15, further comprising processor-executable instructions configured to cause the one or more processors to:
  provide, to the first client device, a replay of one or more sections of the modified recording, wherein the replay comprises a prompt that provides a selection to remove the one or more sections of the modified recording.

* * * * *